(12) United States Patent
Mitra et al.

(10) Patent No.: US 11,171,931 B2
(45) Date of Patent: Nov. 9, 2021

(54) METHOD AND SYSTEM FOR PROVIDING A LIGHT-WEIGHT SECURE COMMUNICATION FOR COMPUTING DEVICES

(71) Applicant: Wipro Limited, Bangalore (IN)

(72) Inventors: Sumit Shovon Mitra, Kolkata (IN); Sayon Sur, Kolkata (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 292 days.

(21) Appl. No.: 16/370,939

(22) Filed: Mar. 30, 2019

(65) Prior Publication Data

US 2020/0267127 A1 Aug. 20, 2020

(30) Foreign Application Priority Data

Feb. 15, 2019 (IN) .............................. 201941006124

(51) Int. Cl.
| | |
|---|---|
| *H04L 9/06* | (2006.01) |
| *H04L 29/06* | (2006.01) |
| *H04L 9/08* | (2006.01) |
| *H04L 9/14* | (2006.01) |
| *H04L 9/32* | (2006.01) |

(52) U.S. Cl.
CPC ........ *H04L 63/0428* (2013.01); *H04L 9/0819* (2013.01); *H04L 9/0861* (2013.01); *H04L 9/14* (2013.01); *H04L 9/3242* (2013.01)

(58) Field of Classification Search
CPC . H04L 63/0428; H04L 9/0819; H04L 9/3242; H04L 9/14

USPC .......................................................... 713/171
See application file for complete search history.

(56) References Cited

U.S. PATENT DOCUMENTS

| | | | | |
|---|---|---|---|---|
| 7,457,411 B2* | 11/2008 | Soliman | ................ | H04L 9/0822 380/44 |
| 7,995,758 B1* | 8/2011 | Shapiro | ................. | H04L 9/0891 380/259 |
| 8,204,220 B2* | 6/2012 | Candelore | .......... | H04N 21/2221 380/44 |
| 8,341,249 B2* | 12/2012 | Rakowski | ............. | H04L 63/083 709/220 |

(Continued)

*Primary Examiner* — Amare F Tabor
(74) *Attorney, Agent, or Firm* — Finnegan, Henderson, Farabow, Garrett & Dunner, LLP

(57) ABSTRACT

This disclosure relates to method and system for providing a light weight secure communication for computing devices. In one example, the method includes generating a new encryption key based on a selected encryption key from among a plurality of encrypted keys and a current synchronized hash based on a set of pre-defined rules, generating an updated synchronized hash based on a message to be transmitted and the current synchronized hash using a pre-defined hash algorithm, encrypting the message to be transmitted using the new encryption key to generate an encrypted message, transmitting the encrypted message, and replacing the current synchronized hash with the updated synchronized hash. The set of pre-defined rules and the pre-defined hash algorithm are retrieved from a pre-installed library. Further, the current synchronized hash, the plurality of encryption keys, and the pre-installed library are synchronized between the first computing device and the second computing device.

15 Claims, 13 Drawing Sheets

(56) References Cited

U.S. PATENT DOCUMENTS

| | | | |
|---|---|---|---|
| 8,549,296 B2* | 10/2013 | Driscoll | H04L 9/3236 |
| | | | 713/170 |
| 9,077,521 B2* | 7/2015 | Machani | H04L 63/123 |
| 9,699,659 B2 | 7/2017 | Zehavi et al. | |
| 10,193,874 B2* | 1/2019 | Fujiwara | G06Q 40/02 |
| 10,200,197 B1* | 2/2019 | Li | H04L 9/008 |
| 2009/0034715 A1* | 2/2009 | Ramasamy | H04L 9/0637 |
| | | | 380/28 |
| 2015/0071216 A1 | 3/2015 | Ilsar et al. | |

\* cited by examiner

METHOD AND SYSTEM FOR PROVIDING A LIGHT-WEIGHT SECURE COMMUNICATION FOR COMPUTING DEVICES

This application claims the benefit of Indian Patent Application Serial No. 201941006124, filed Feb. 15, 2019, which is hereby incorporated by reference in its entirety.

FIELD

This disclosure relates generally to secure communication, and more particularly to method and system for providing a light-weight secure communication for computing devices.

BACKGROUND

With a growing number of distributed internet of things (IoT) systems comprising of IoT devices ranging from low-end devices to a high-end devices, a secure way of device management has become one of the key success factors. The secure device management may involve a secure way of onboarding devices, and a secure way of communicating with the devices.

Some conventional communication techniques may involve generating a private cryptographic key and an authentication token during initial device setup, or pairing of an IoT devices in a private network. However, the conventional technique may not update session key with every message, and may store it locally for validation of sender. Current techniques may also employ secure certificate based solution, where asymmetric key may be used for establishing secure channel for sharing the symmetric key which may then be used for secure communication. However, such asymmetric key management being computationally intensive have significant power requirement and may not be suitable for low power devices.

SUMMARY

In one embodiment, a method for providing a secure communication between a first computing device and a second computing device is disclosed. In one example, the method may include generating, by a first secure communication framework implemented in the first computing device or a second communication framework implemented in the second computing device, a new encryption key based on a selected encryption key and a current synchronized hash based on a set of pre-defined rules. The selected encryption key is selected from a plurality of encryption keys based on the set of pre-defined rules. Further, the set of pre-defined rules are retrieved from a pre-installed library of the first secure communication framework or the second communication framework respectively. Further, the current synchronized hash, the plurality of encryption keys, and the pre-installed library are synchronized between the first computing device and the second computing device. The method may further include generating, by the first secure communication framework or the second communication framework, an updated synchronized hash based on a message to be transmitted and the current synchronized hash using a pre-defined hash algorithm. The pre-defined hash algorithm is retrieved from the pre-installed library of the first secure communication framework or the second communication framework respectively. The method may further include encrypting, by the first secure communication framework or the second communication framework, the message to be transmitted using the new encryption key to generate an encrypted message. The method may further include transmitting, by the first secure communication framework or the second communication framework, the encrypted message to the second computing device or the first computing device respectively. The method may further include replacing, by the first secure communication framework or the second communication framework, the current synchronized hash with the updated synchronized hash.

In one embodiment, a system for providing a secure communication between a first computing device and a second computing device is disclosed. In one example, the system may include at least one processor and a memory communicatively coupled to the at least one processor. The memory may store processor-executable instructions, which, on execution, may cause the processor to generate, by a first secure communication framework implemented in the first computing device or a second communication framework implemented in the second computing device, the new encryption key based on the selected encryption key and the current synchronized hash based on the set of pre-defined rules. The selected encryption key is selected from the plurality of encryption keys based on the set of pre-defined rules. Further, the set of pre-defined rules are retrieved from a pre-installed library of the first secure communication framework or the second communication framework respectively. Further, the current synchronized hash, the plurality of encryption keys, and the pre-installed library are synchronized between the first computing device and the second computing device. The processor-executable instructions, on execution, may further cause the processor to generate, by the first secure communication framework or the second communication framework, the updated synchronized hash based on the message to be transmitted and the current synchronized hash using the pre-defined hash algorithm. The pre-defined hash algorithm is retrieved from the pre-installed library of the first secure communication framework or the second communication framework respectively. The processor-executable instructions, on execution, may further cause the processor to encrypt, by the first secure communication framework or the second communication framework, the message to be transmitted using the new encryption key to generate the encrypted message. The processor-executable instructions, on execution, may further cause the processor to transmit, by the first secure communication framework or the second communication framework, the encrypted message to the second computing device or the first computing device respectively. The processor-executable instructions, on execution, may further cause the processor to replace, by the first secure communication framework or the second communication framework, the current synchronized hash with the updated synchronized hash.

In one embodiment, a non-transitory computer-readable medium storing computer-executable instructions for providing a secure communication between the first computing device and the second computing device is disclosed. In one example, the stored instructions, when executed by a processor, may cause the processor to perform operations including generating, by a first secure communication framework implemented in the first computing device or a second communication framework implemented in the second computing device, the new encryption key based on the selected encryption key and the current synchronized hash based on the set of pre-defined rules. The selected encryption key is selected from the plurality of encryption keys based on the set of pre-defined rules. Further, the set of pre-defined rules are retrieved from a pre-installed library of the first secure communication framework or the second communication framework respectively. Further, the current synchronized hash, the plurality of encryption keys, and the pre-installed library are synchronized between the first computing device and the second computing device. The operations may further include generating, by the first secure communication framework or the second communication framework, an updated synchronized hash based on the message to be transmitted and the current synchronized hash using the pre-defined hash algorithm. The pre-defined hash algorithm is retrieved from the pre-installed library of the first secure communication framework or the second communication framework respectively. The operations may further include encrypting, by the first secure communication framework or the second communication framework, the message to be transmitted using the new encryption key to generate an encrypted message. The operations may further include transmitting, by the first secure communication framework or the second communication framework, the encrypted message to the second computing device or the first computing device respectively. The operations may further include replacing, by the first secure communication framework or the second communication framework, the current synchronized hash with the updated synchronized hash.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
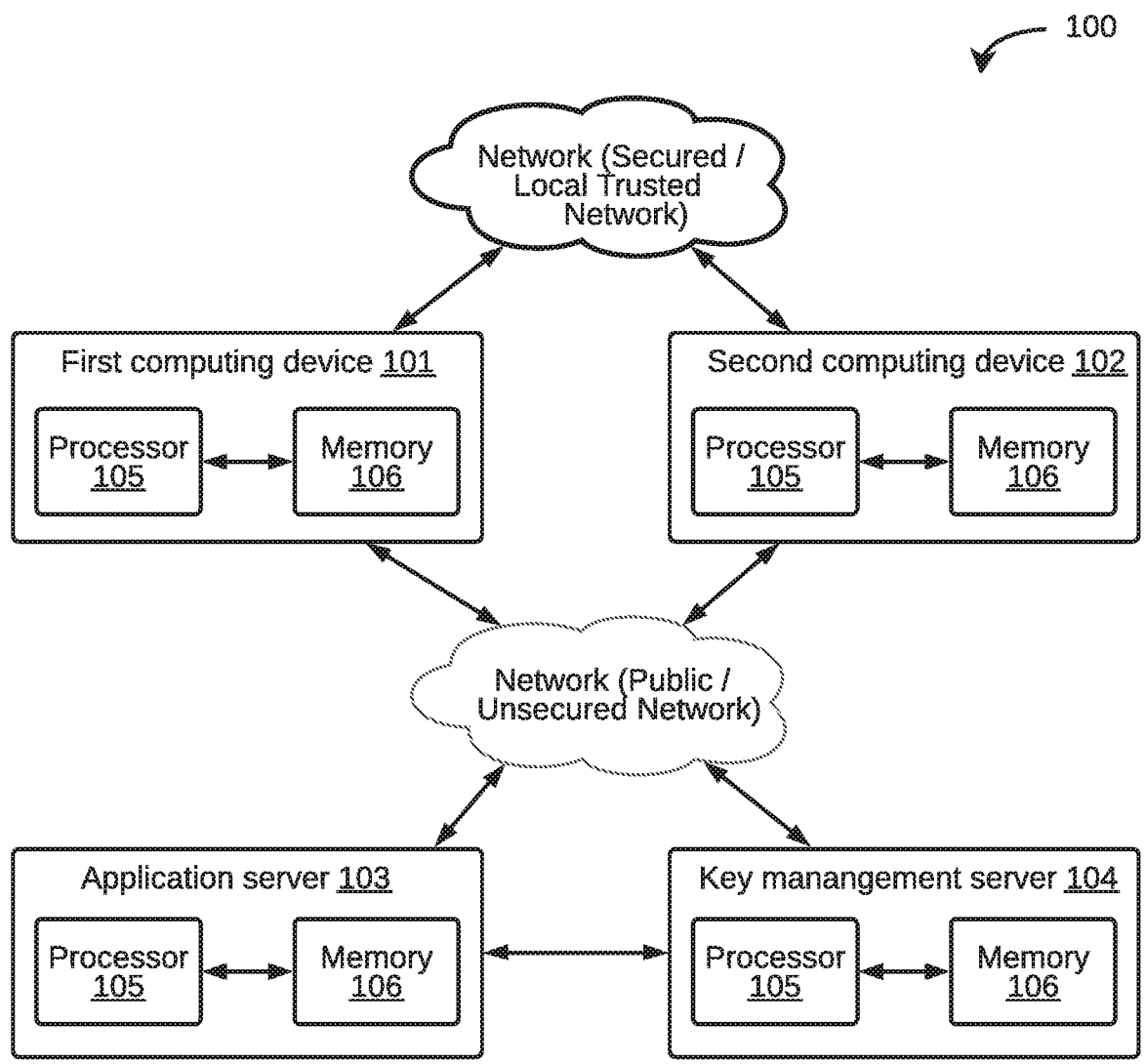
FIG. 1 is a functional block diagram of a light-weight secure communication system for enabling a secure communication, in accordance with some embodiments of the present disclosure.

Referring now to FIG. 1, is a functional block diagram of a light-weight secure communication system 100 for enabling a secure communication is illustrated, in accordance with some embodiments of the present disclosure. The secure communication system 100 may include a first computing device 101, a second computing device 102, an application server 103, and a key management server 104. Each of the first computing device 101, the second computing device 102, the application server 103 and the key management server 104 may further include a processor 105 and a memory 106. The first computing device 101 may include, but are not be limited to a low power device, an Internet of things (IoT) device or the like. The second computing device 102 may be a portable computing device including, but not limited to, a laptop, a netbook, a tablet, a smartphone, a personal digital assistant (PDA), a mobile phone, or the like. In some embodiments, the second computing device 102 may be a fixed computing device such as a server or a desktop in communication with a number of first computing devices 101. As will be appreciated by those skilled in the art, the second computing device 102, the application server 103, and the key management server 104 may be represented as a single device or a combination of one or more of the second computing device 102, the application server 103 and the key management server 104. Moreover, as will be appreciated by those skilled in the art, the key management server 104 may reside, in whole or in parts, within the application server 103 or vice versa.

Alternatively, for example, both the key management server 104 and the application server 103 may reside, in whole or in parts, within the second computing device 102 or vice versa. The first computing device 101 and the second computing device 102 may communicate with each other via a secure communication over a secure network or a local trusted network, in accordance with some embodiments of the present disclosure. Further, the first computing device 101 and the second computing device 102 may communicate with the key management server 104 and the application server 103 via a secure communication over a public network or unsecured network, in accordance with some embodiments of the present disclosure. The key management server 104 and the application server 103 may communicate with each other via a secure communication over the public network or the unsecured network, in accordance with some embodiments of the present disclosure.

Figure 2:
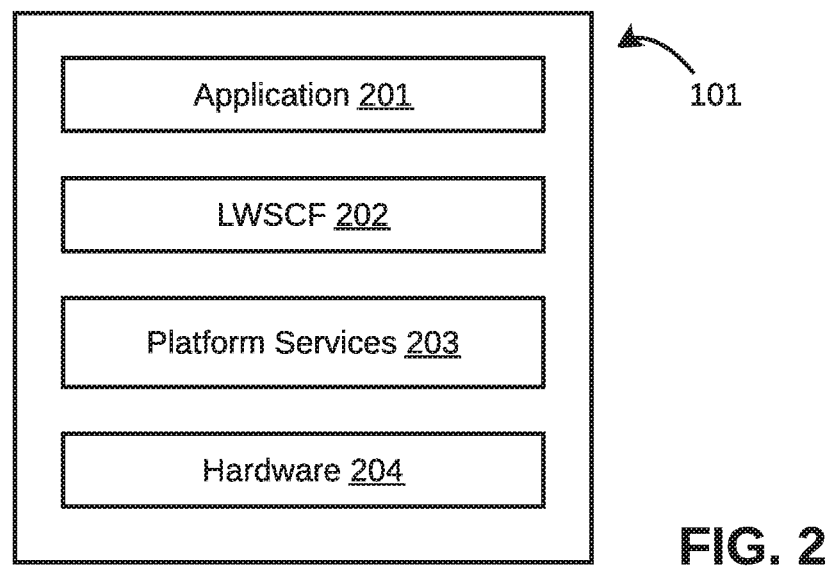
FIG. 2 is a functional block diagram of a first computing device, in accordance with some embodiments of the present disclosure.

Referring now to FIG. 2, a functional block diagram of a first computing device 101 is illustrated, in accordance with some embodiments of the present disclosure. The first computing device 101 may use a light weight secure communication framework (LWSCF) 202 for secure communication with a second computing device 102. The first computing device 101 may include an application 201 to operate. Moreover, the application 201 may use the LWSCF 202 for encrypting and decrypting a message while communicating with the second computing device 102. The LWSCF 202 may leverage underlying a platform service 203 which may use a hardware 204 based security implementation which may include Hardware Security Module (HSM), Hardware Trust Anchor (HTA) or the like.

Figure 3:
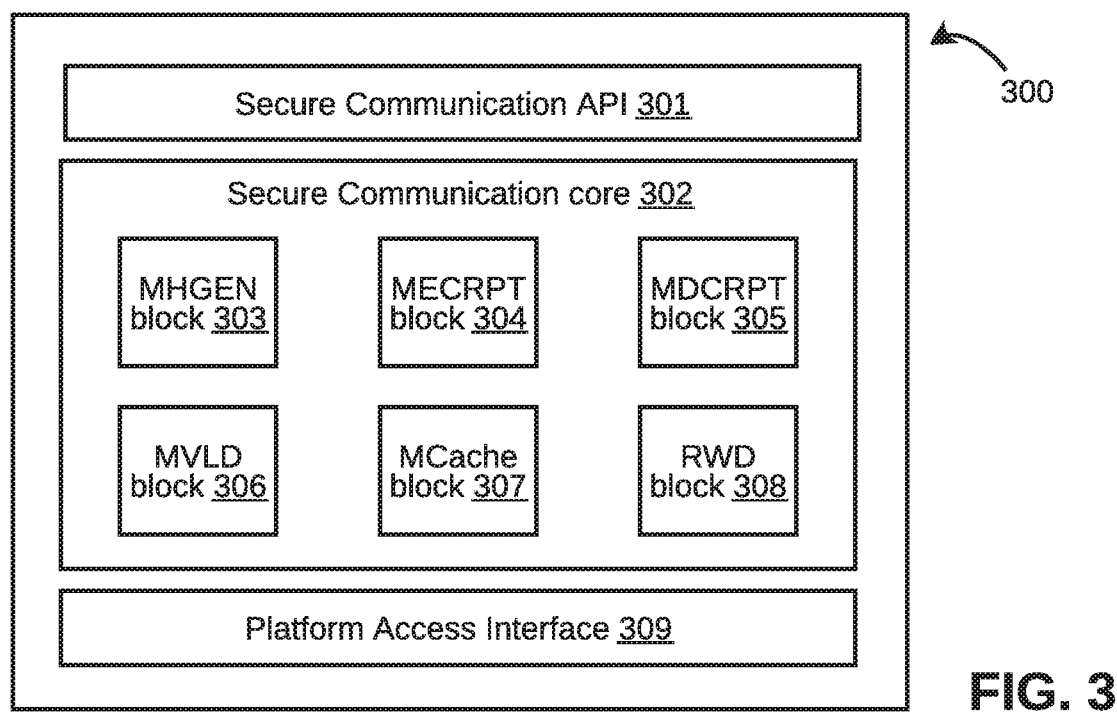
FIG. 3 is a functional block diagram of a light weight secure communication framework, in accordance with some embodiments of the present disclosure.

Referring now to FIG. 3, a functional block diagram of a light weight secure communication framework (LWSCF) 300 is illustrated, in accordance with some embodiments of the present disclosure. As will be described in greater detail below, the LWSCF 300 may avoid a compute-intensive asymmetric key management and may provide a hardware agnostic interface for the first computing device 101. A LWSCF 300 may include a secure communication application programming interface (API) 301, a secure communication core 302, and a platform access interface 309. As will be appreciated, the LWSCF 300 may be implemented in each of the first computing device 101 and the second computing device 102. Upon implementation, the LWSCF 300 implemented in the first computing device 101 may be referred to as first secure communication framework, while the LWSCF 300 implemented in the second computing device 102 may be referred to as second secure communication framework. The first computing device 101 and the second computing device 102 may communicate with each other via the first secure communication framework and the second secure communication framework.

The API may be a set of unified API provided to the application 201, by the secure communication system 100, to encrypt or decrypt a message. The secure communication API 301 may perform factory reset in which the secure communication API 301 may remove a keymap from the memory 106 and may restore the first computing device 101 to a factory state. Moreover, the secure communication API 301 may include an encrypted message block which may encrypt the message based on a selected encryption key of a plurality of encryption keys, a current synchronized hash, and an updated synchronized hash. Further, the secure communication API 301 may include a decrypted message block where the secure communication API 301 may decrypt the message based on the selected encryption key of the plurality of encryption keys, the current synchronized hash, and the updated synchronized hash. Additionally, the secure communication API 301 may decrypt a key based on at least one of a device identification, a unique initialization key or the like and then store the key.

The secure communication core 302 may be a core of the techniques described herein and may be responsible for the secure communication between the first computing device 101 and the second computing device 102 inside the secure communication system 100. The secure communication core 302 may further include a message hash generation block (MHGEN) 303, a message encryption block (MECRPT) 304, a message decryption block (MDCRPT) 305, a message validation block (MVLD) 306, a memory cache (MCache) 307 and a read write demon (RWD) 308. The MHGEN 303 may generate an initial synchronized hash based a pre-defined hash algorithm. The pre-defined hash algorithm may depend on a version of a pre-installed library. Hence, dependency on the pre-installed library may be an additional layer of security to the secure communication.

The MECRPT 304 may be responsible for encrypting the message. The encryption algorithm and key selection may depend on the selected encryption key of the plurality of encryption keys, the current synchronized hash, and the updated synchronized hash. The updated synchronized hash may be an n bits of the plurality of bits of the current synchronized hash. Moreover, the updated synchronized hash may keep synchronization between the first computing device 101 and one of the second computing device 101 or the application server 103. The MDCRPT 305 may be responsible for decrypting the message. The decryption algorithm and the selected encryption key of the plurality of encryption keys procedure may be depended on the pre-installed library. The MVLD block 306 may be responsible for validating a decrypted message. The Mcache 307 may be used to store the current synchronized hash of a recent transaction. The RWD block 308 may periodically flush the in-memory hashes into persistence stored based on the defined process.

The secure communication core 302 may use the platform access interface 309 to access the platform services in the first computing device 101 or the second computing device 102 or the application server 103. The platform may leverage a crypto accelerator based on the hardware configuration. Further, the platform access interface 309 may persistently store the data in the memory 106.

Figure 4:
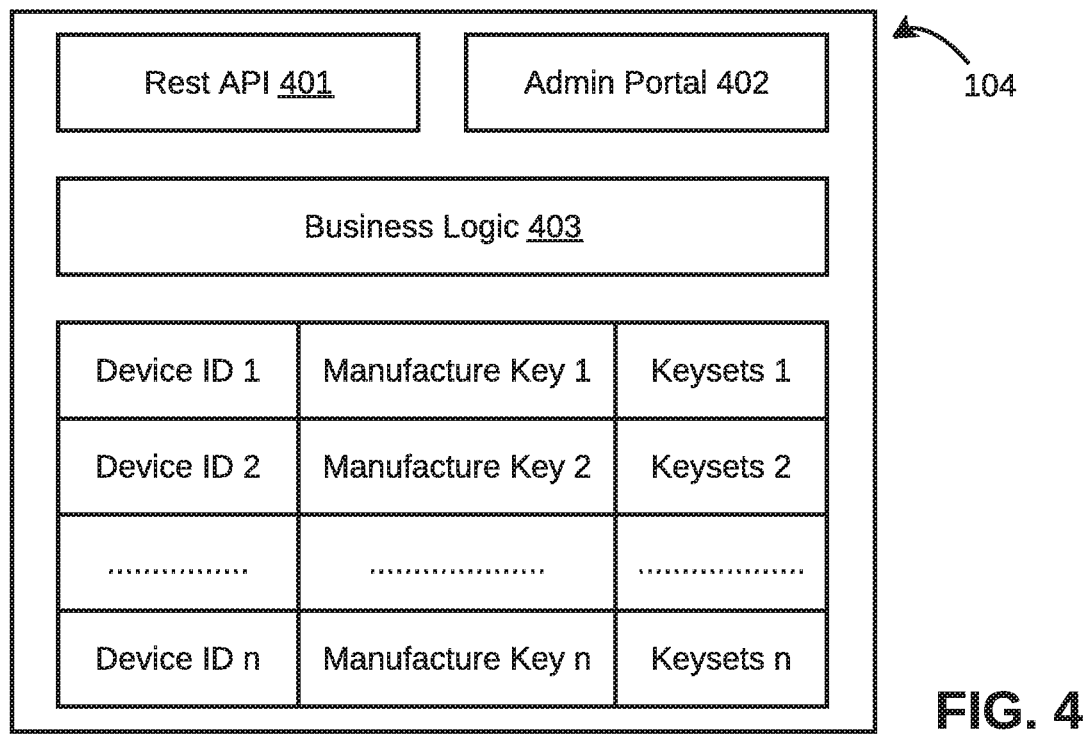
FIG. 4 is a functional block diagram of a key management server, in accordance with some embodiments of the present disclosure.

Referring now to FIG. 4, a functional block diagram of the key management server 104 is illustrated, in accordance with some embodiments of the present disclosure. The key management server 104 may be used as a primary key manager. The key management server 104 may be responsible to store and generate a plurality of encryption keys. The key management server 104 may store the device identification and corresponding the unique initialization key. The same unique initialization key may also be embedded in the first computing device 101. Further, the first computing device 101 may interact with the key management server 104 via the second computing device 102. Moreover, the key management server 104 may generate a plurality of encryption keys for each of the first computing device 101 which may be used in future transactions. Additionally, the key management server 104 may transfer the plurality of encryption keys to both the first computing device 101 and the application server 103.

Figure 5:
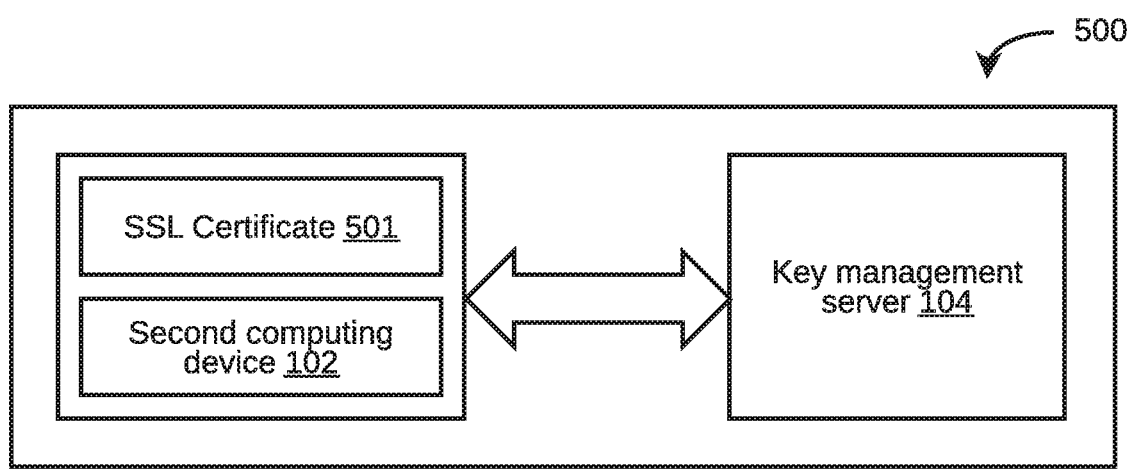
FIG. 5 is a block diagram illustrating secure communication between a second computing device and a key management server, in accordance with some embodiments of the present disclosure.

Referring now to FIG. 5, is a secure communication between a second computing device 102 and a key management server 104 is illustrated, in accordance with some embodiments of the present disclosure. In an on-boarding process, a second computing device 102 may be used to exchange a plurality of encryption keys. The second computing device 102 may be used in the on-boarding process to exchange the plurality of encryption keys under a secured environment. The second computing device 102 and the first computing device 101 may reside in a secure intranet. The second computing device 102 may interact with the key management server 104 via a PKI (Public Key Infrastructure). The second computing device 102 is needed to provide the PKI communication with key management server 104. Additionally, after the on-boarding process, the first computing device 101 may communicate directly with the application server 103 over secure sockets layer (SSL) via the PKI.

Figure 6:
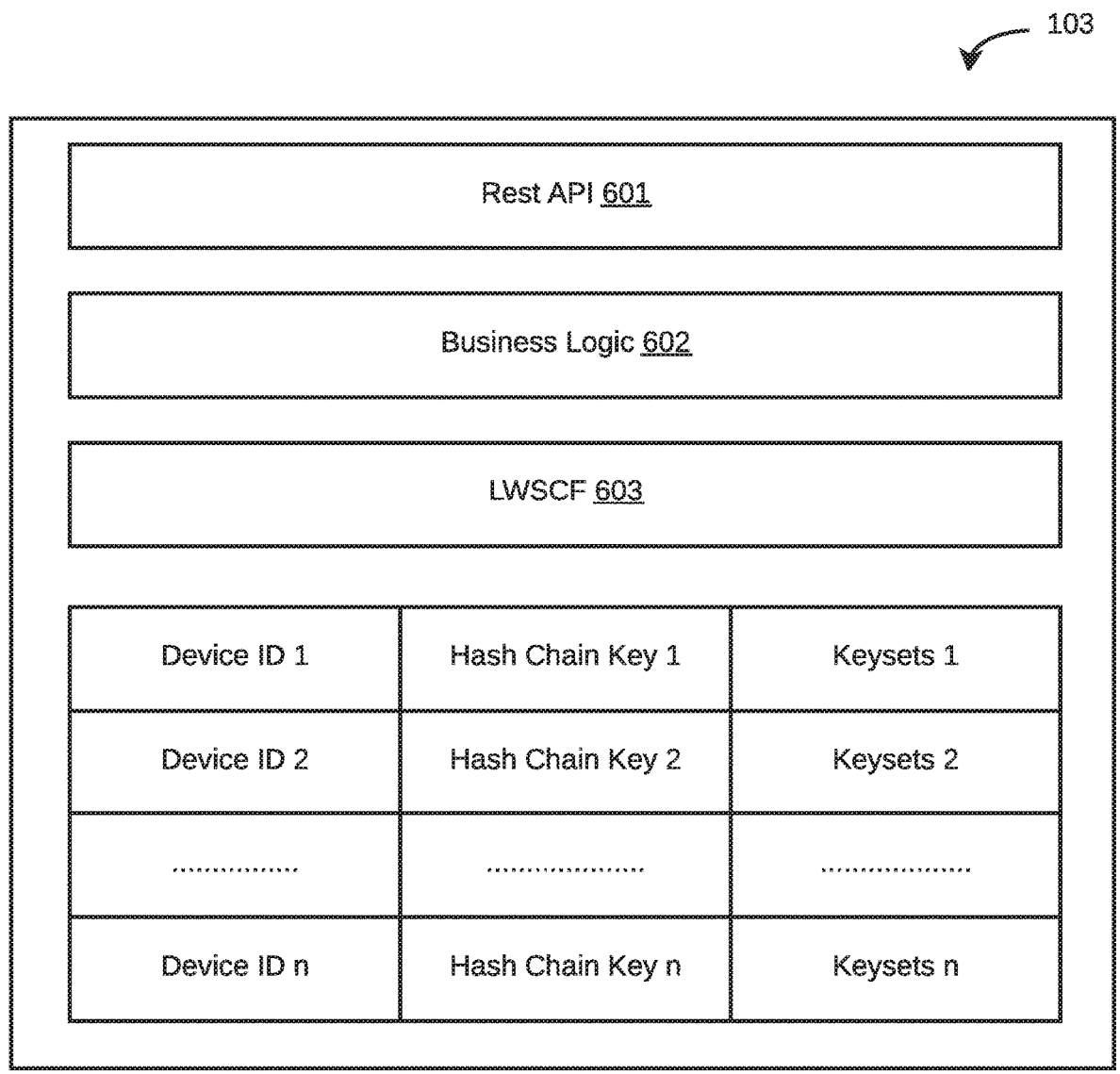
FIG. 6 is a functional block diagram of an application server, in accordance with some embodiments of the present disclosure.

Referring now to FIG. 6, a functional block diagram of the application server 103 is illustrated, in accordance with some embodiments of the present disclosure. After an initial on-boarding of the secure communication system 100, the first computing device 101 and the second communication device 102 or the application server 103 may directly communicate with each other. The application server 103 and the first computing device 101 may communicate with each other over the secure communication, in accordance with some embodiments of the present disclosure. The application server 103 may store a pair of an initial synchronized hash matching with the first computing device 101. Moreover, the application server 103 may store a pre-defined library of the secure communication framework so as to operate the encryption and the decryption function, and hash generation function. Additionally, the plurality of encryption keys, particular for each of the first computing device 101, may be pushed to the application server 103. The application server 103 may be responsible for detecting any attempt to tamper with the secure communication. Further, the application server 103 may notify an administrator about the detected tampering attempt. This is further explained in detail in conjunction with FIG. 14.

Figure 7:
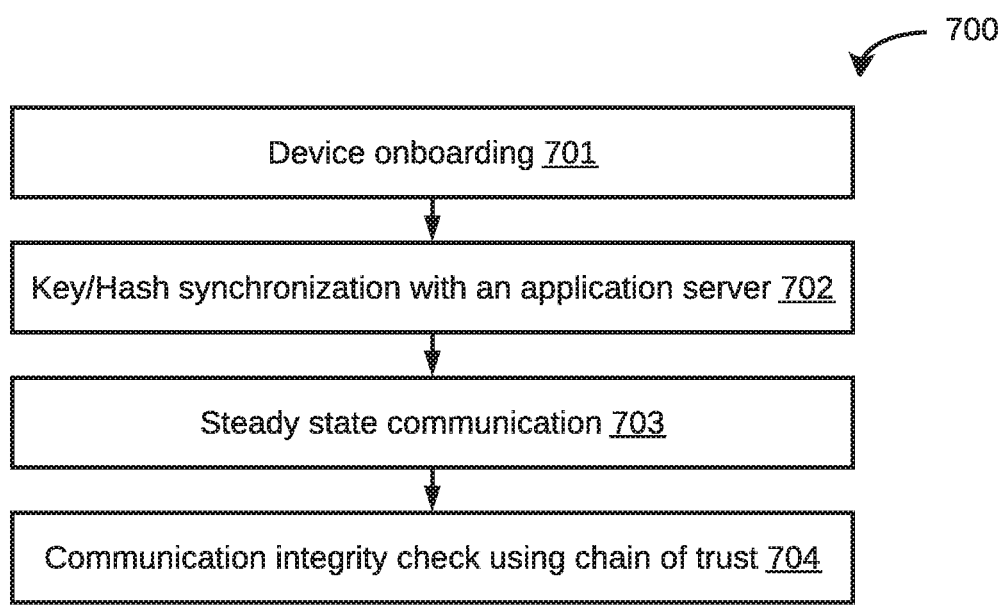
FIG. 7 is a flow diagram of an exemplary process overview for providing a secure communication between a first computing device and a second computing device, in accordance with some embodiments of the present disclosure.

Referring now to FIG. 7, an exemplary process overview 700 for providing a secure communication between a first computing device and a second computing device is depicted via a flow diagram, in accordance with some embodiments of the present disclosure. At step 701, a first secure communication framework may onboard a secure communication system 100 by communicatively pairing a first computing device 101 and a second computing device 102. This is further explained in detail in conjunction with FIG. 8. Further, at step 702, the secure communication system 100 may synchronize the initial synchronized hash and the plurality of encryption keys between the application server 103 and the first computing device 101. The workflow of synchronization the initial synchronized hash and the plurality of encryption keys may include a message transfer, acknowledgement of the message, generating synchronized message hash, and storing of message hash. This is further explained in detail in conjunction with FIG. 9. Further, at step 703, a steady state communication between the first computing device 101 and the second computing device 102 may be performed. This is further explained in detail in conjunction with FIG. 10. Moreover, at step 704, an integrity check of communication between the first computing device 101 and the second computing device 102 may be performed based on a chain of trust established between the two. In particular, the integrity of any message received by the first computing device 101 or the second computing device 102 may be checked by validating the message as well optionally validating the synchronized hash based on information in the message. This is further explained in detail in conjunction with FIG. 14.

Figure 8:
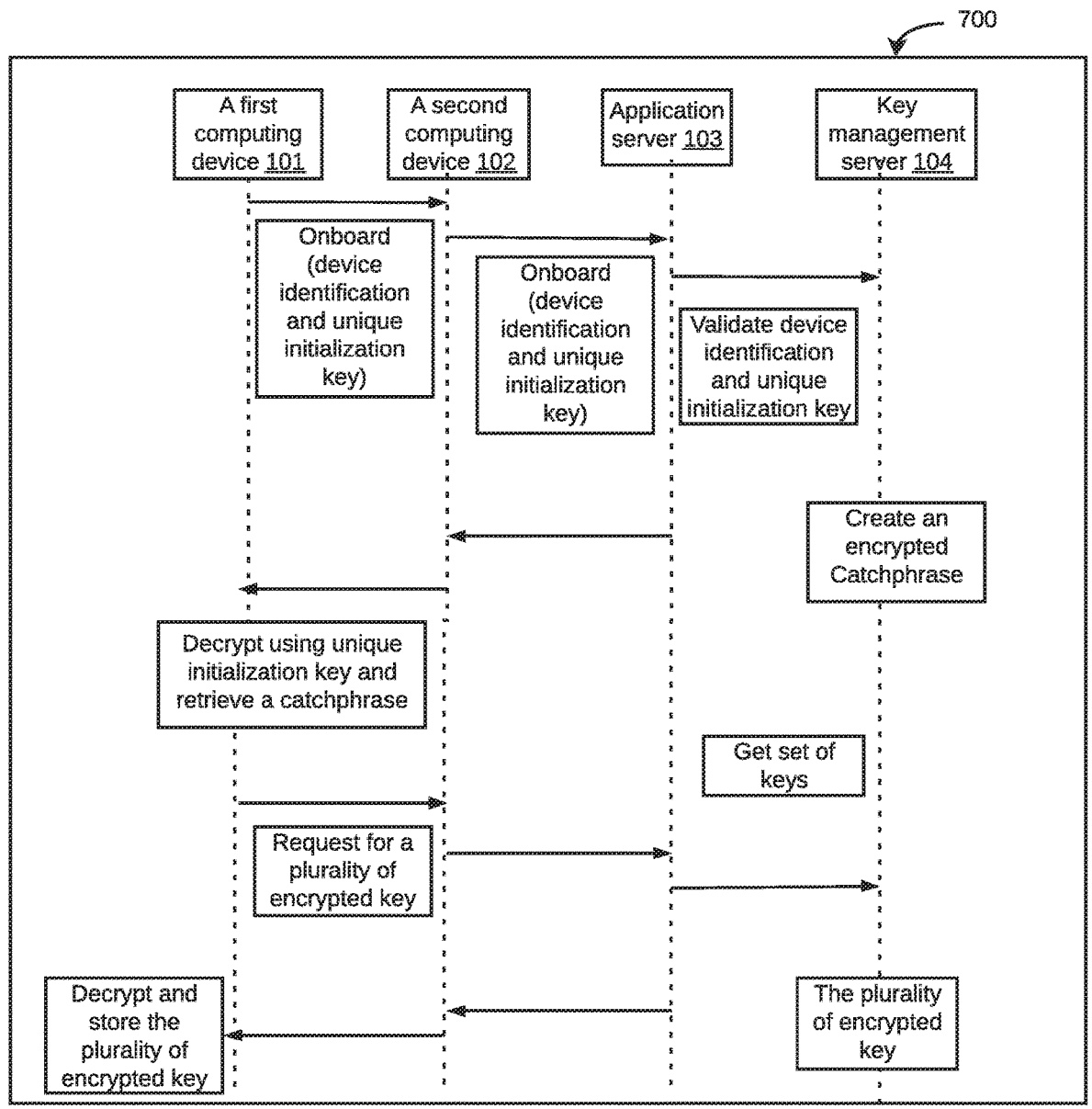
FIG. 8 is a flow diagram of an exemplary process for onboarding a first computing device, in accordance with some embodiments of the present disclosure.

Referring now to FIG. 8, an exemplary process 800 for onboarding a first computing device is depicted via a flow diagram, in accordance with some embodiments of the present disclosure. The first computing device 101 may include onboarding information such as a device identification and a unique initialization key. It should be noted that the device identification and the unique initialization key may be pre-configured in the first computing device 101. Further, the first computing device 101 may transmit a device identification and a unique initialization key to a key management server 104 through a second computing device 102 over a secure socket layer (SSL). The key management server 104 may receive and validate the device identification and the unique initialization key. Moreover, the key management server 104 may transmit an encrypted catchphrase to the first computing device 101 through the second computing device 102 over the SSL. Further, the first computing device 101 may decrypt the encrypted catchphrase and transmits a response to the key management server 104. The key management server 104 may validate the response and transmits a plurality of encryption keys to the first computing device 101. The plurality of encryption keys may be stored by the first computing device 101 in the memory 106. Further, the key management server 104 may generate an initial synchronized hash which may be used for further communication to establish a strong chain of trust for communication of a message between the first computing device 101 and the second computing device 102. Moreover, the initial synchronized hash may ensure detection of any tampering effort to the first computing device 101 or with the secure communication. It should be noted that the initial synchronized hash may not be transmitted between the first computing device 101 and the key management server 104.

Figure 9:
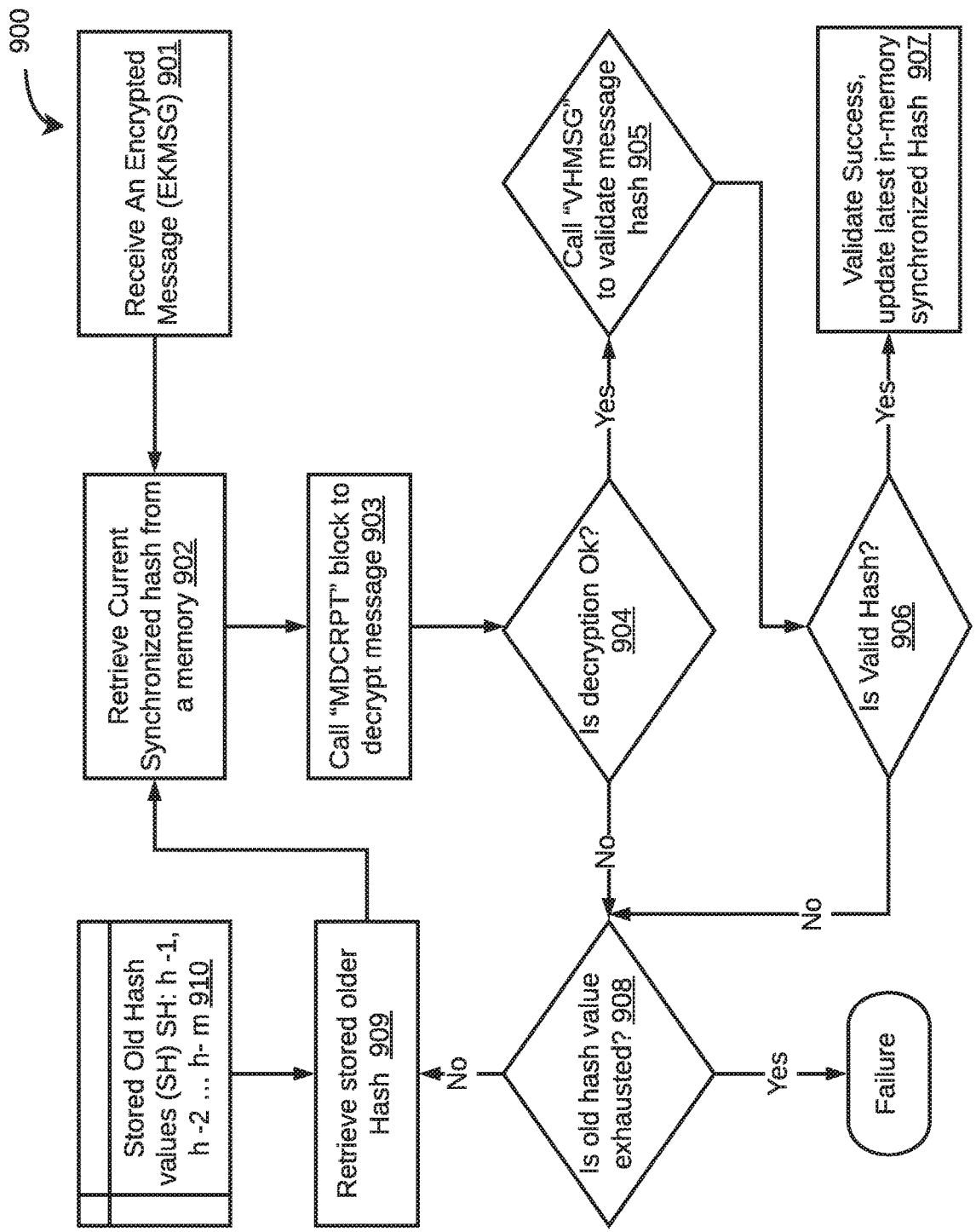
FIG. 9 is a flow diagram of an exemplary process for synchronizing the initial synchronized hash and the plurality of encryption keys between the first computing device and a second computing device, in accordance with some embodiments of the present disclosure.

Referring now to FIG. 9, an exemplary process 900 for synchronizing an initial synchronized hash and a plurality of encryption keys between the first computing device and a second computing device is depicted via a flow diagram, in accordance with some embodiments of the present disclosure. At step 901, a second computing device 102 may receive an encrypted message from a first computing device 101. Further, at step 902, a secure communication system 100 may retrieve a current synchronized hash. Moreover, at steps 903-907, the secure communication system 100 may pass the current synchronized hash to a message decryption block. When the decryption executed successfully, the secure communication system 100 may pass a decrypted message to a message validation block. When the message validation block validates the decrypted message, the secure communication system 100 may update an updated synchronized hash to the memory 106. Additionally, at step 908, the secure communication system 100 may check whether the old hash value get exhausted either when the decryption is not successful or when the message validation block invalidates the synchronized hash. Moreover, at steps 908-910, the secure communication system 100 may retrieve the stored older hash in the memory 106 and update as current synchronized hash at step 902. It should be noted that the secure communication system 100 may detect any tampering effort when the validation is not successful at step 906, and further when the old hash values have been exhausted at step 908.

Figure 10:
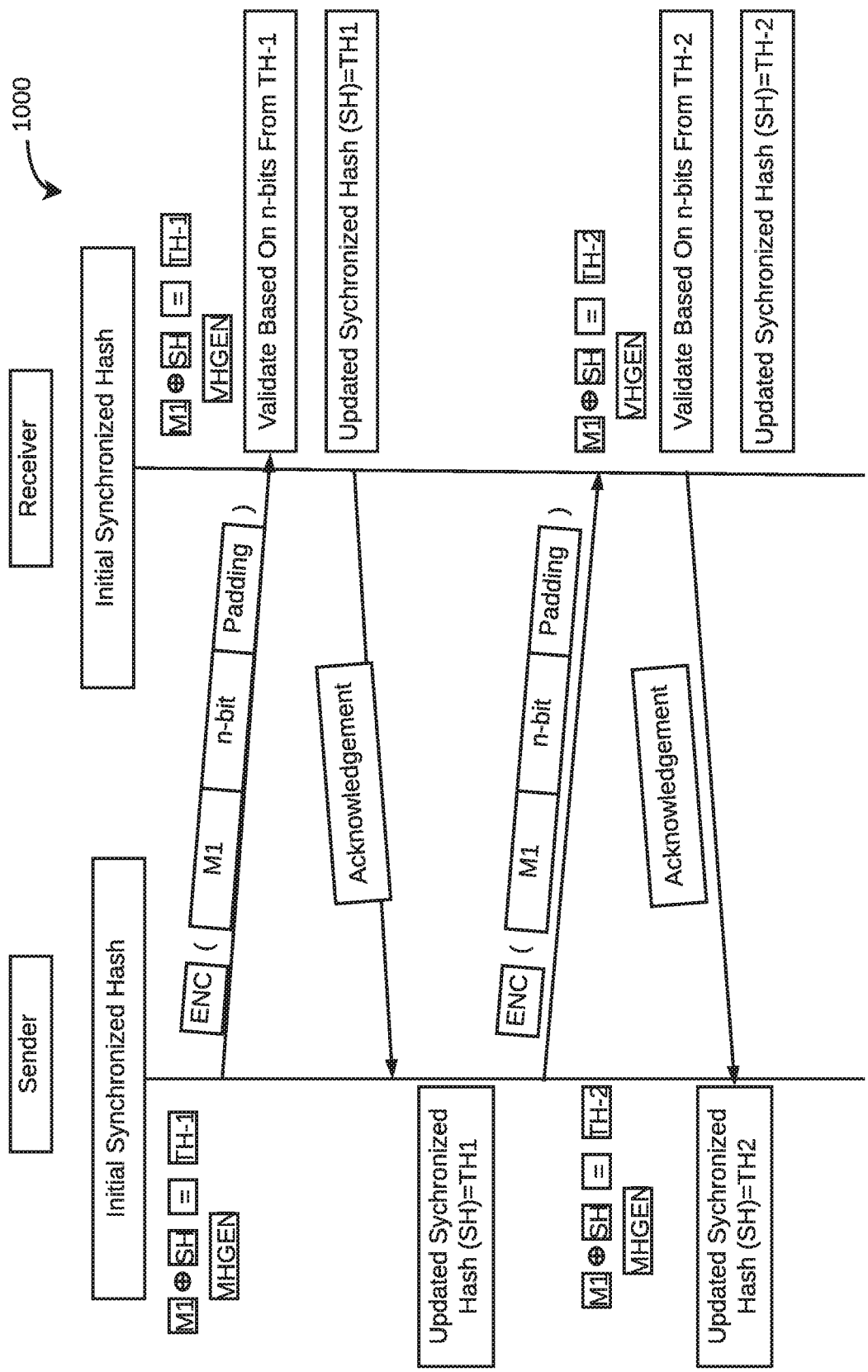
FIG. 10 is a flow diagram of an exemplary process for a steady state secure communication between the first computing device and the second computing device, in accordance with some embodiments of the present disclosure.

Referring now to FIG. 10, an exemplary process 1000 for a steady state secure communication between the first computing device and the second computing device is depicted via a flow diagram, in accordance with some embodiments of the present disclosure. A steady state secure communication of a message may be executed between a sender and a receiver. The message (M1) may be encrypted using t-bits of a current synchronized hash and m-bits of a selected encryption key of a plurality of encryption keys, to get an encrypted message. The m-bits of the selected encryption key may be a new encryption key which may be selected based on a pre-defined rule. Further, the encrypted message may be transmitted to the receiver. The receiver may have the t-bits of the current synchronized hash and the m-bits of the selected encryption key of the plurality of encryption keys. Hence, the receiver may decrypt the encrypted message based on the t-bits of the current synchronized hash and the m-bits of the selected encryption key of the plurality of encryption keys.

In some embodiments, for a second stage security, the sender may store an updated synchronized hash (TH1) which may be an addition of the message (M1) and the current synchronized hash. Further, the message (M1) may be encrypted using the t-bits of the current synchronized hash, the m-bits of a selected encryption key of a plurality of encryption keys, n-bits of the updated synchronized hash and padding, to get the encrypted message. Further, the receiver may have the message (M1) and the current synchronized hash (SH). Hence, the receiver may generate the updated synchronized hash to decrypt the encrypted message. Moreover, both the sender and receiver may update the updated synchronized hash as TH1 for future communication.

Figure 11:
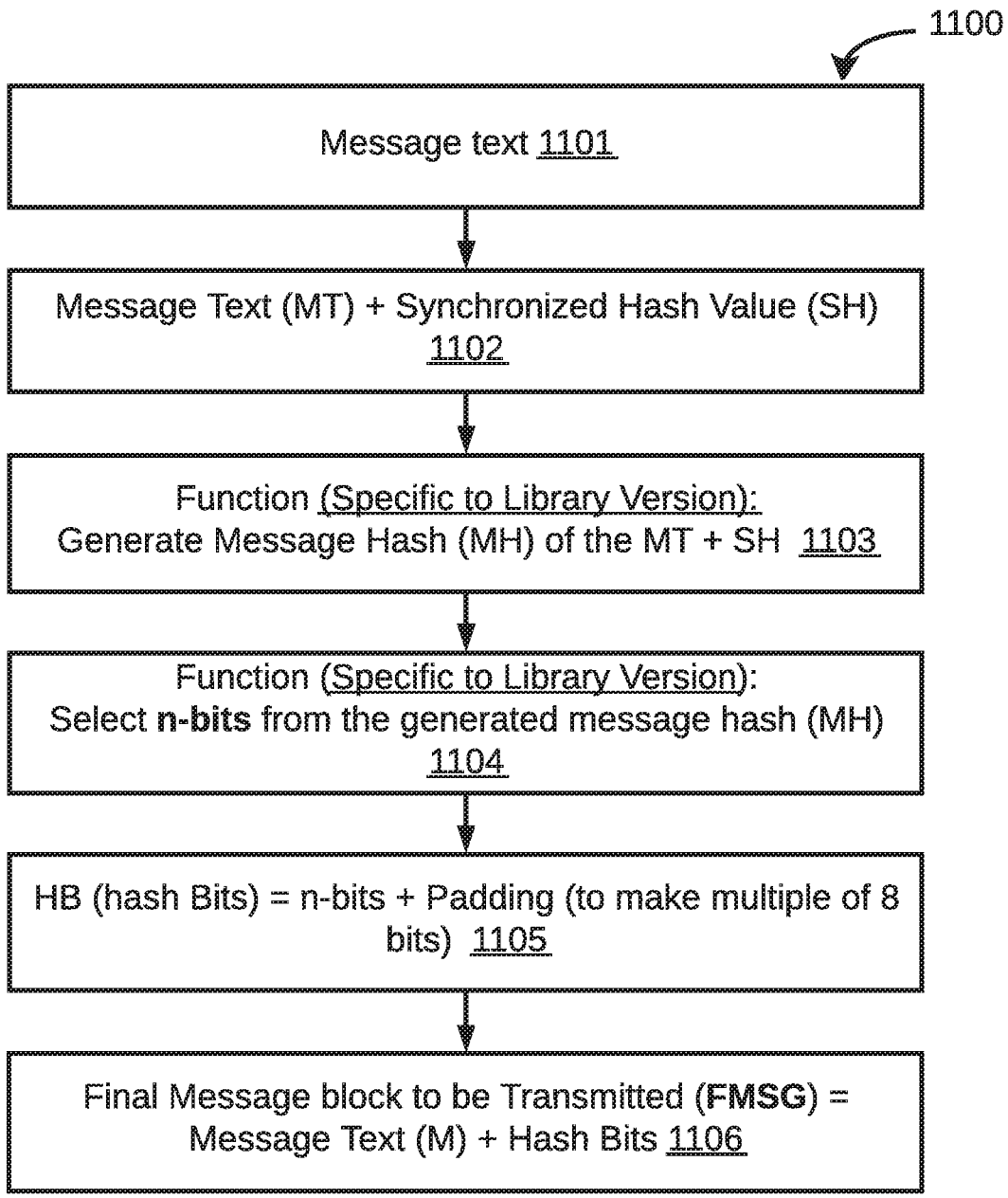
FIG. 11 is a flow diagram for generating a hash by a message hash generation block, in accordance with some embodiments of the present disclosure.

Referring now to FIG. 11, an exemplary process 1100 for generating a hash by a message hash generation block (MHGEN) is depicted via a flow diagram, in accordance with some embodiments of the present disclosure. At step 1101, the message hash generation block may receive a message. The message may be the message which need to send from a sender to a receiver. Further, at step 1102, the message hash generation block may perform an addition of the message with a current synchronized hash at. At step 1103, the addition of the message and the synchronized hash may pass through a hash algorithm to generate a new hash. Additionally, a specific hash function (for example—SH1, SH256, or the like) may depend on a pre-installed library.

In some embodiments, at step 1104, n-bit of an updated synchronized hash may be selected from the addition of the message and the current synchronized hash. The n-bit of the updated synchronized hash may be a message hash. Further, at step 1105, the message hash generation block may perform an addition of the message hash with the message. A resultant of the addition of the message hash and the message may be a final message. At step 1106, the message hash generation block may transmit an updated encrypted message after encryption from the sender to the receiver. This is further explained in detail in conjunction with FIG. 14.

Figure 12:
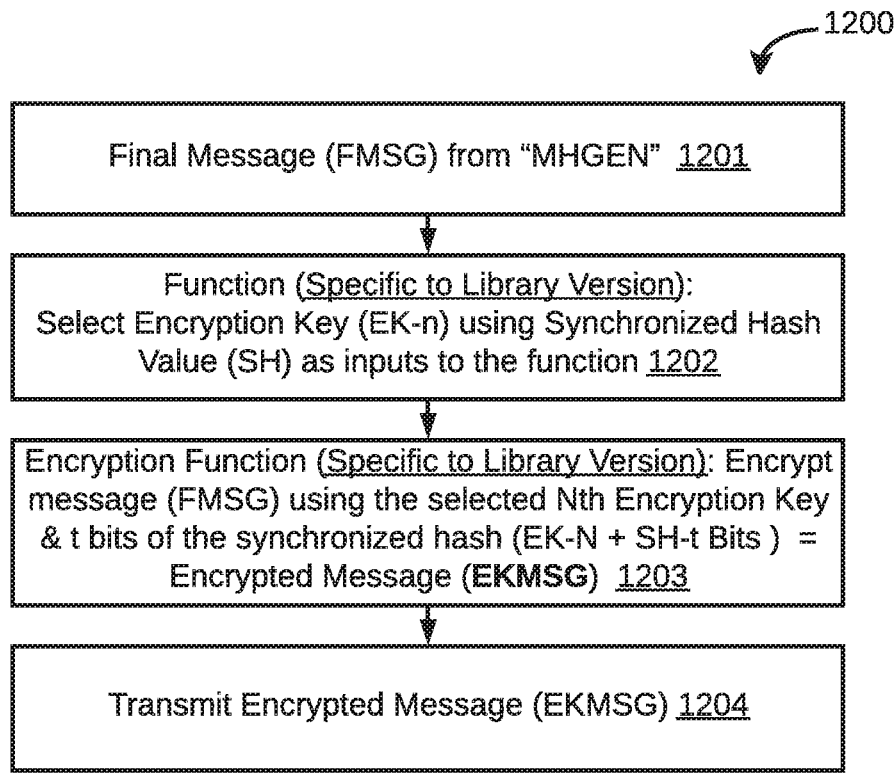
FIG. 12 is a flow diagram for encrypting message by a message encryption block, in accordance with some embodiments of the present disclosure.

Referring now to FIG. 12, an exemplary process 1200 for encrypting message by a message encryption block (MECRPT) is depicted via a flow diagram, in accordance with some embodiments of the present disclosure. At step 1201, the message encryption block may receive the message hash from the message hash generation block. Moreover, at step 1202, the specific library function may select a selected encryption key from a plurality of encryption keys based on the current synchronized hash. Further, at step 1203, a message encryption function may encrypt the message using m bits of the selected encryption key and t-bits of the current synchronized hash. The message encryption function may include, but are not limited to AES, DES or the like. The t-bits from the synchronized hash may be selected by the message encryption block using a pre-installed library function. Hence, an encrypted message may be generated. Further, at step 1204, the encrypted message may be transmitted to the receiver.

Figure 13:
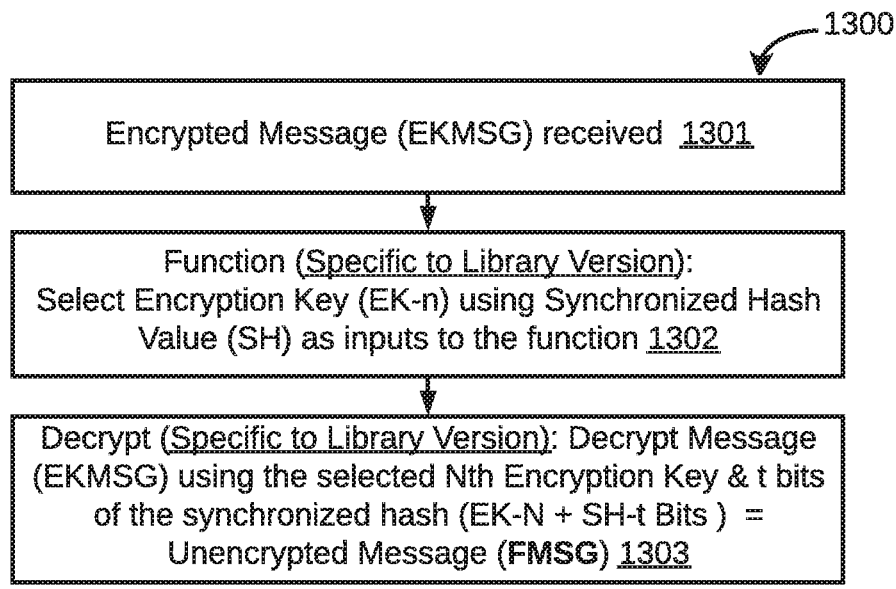
FIG. 13 is a flow diagram for decrypting message by a message decryption block, in accordance with some embodiments of the present disclosure.

Referring now to FIG. 13, an exemplary process 1300 for decrypting message by a message decryption block (MDCRPT) is depicted via a flow diagram, in accordance with some embodiments of the present disclosure. At step 1301, a message decryption block may receive an encrypted message from a sender. Further, at step 1302, a pre-installed library function may select the t-bits of a current synchronized hash and a selected encryption key from a plurality of encryption keys based on the current synchronized hash. Moreover, the message decryption block may select a decryption algorithm based on the pre-installed library. Further, at step 1303, the message decryption block may decrypt the encrypted message based on the decryption algorithm, using the t-bits of synchronized hash and the selected encryption key. Hence, the message decryption block may generate the message.

Figure 14:
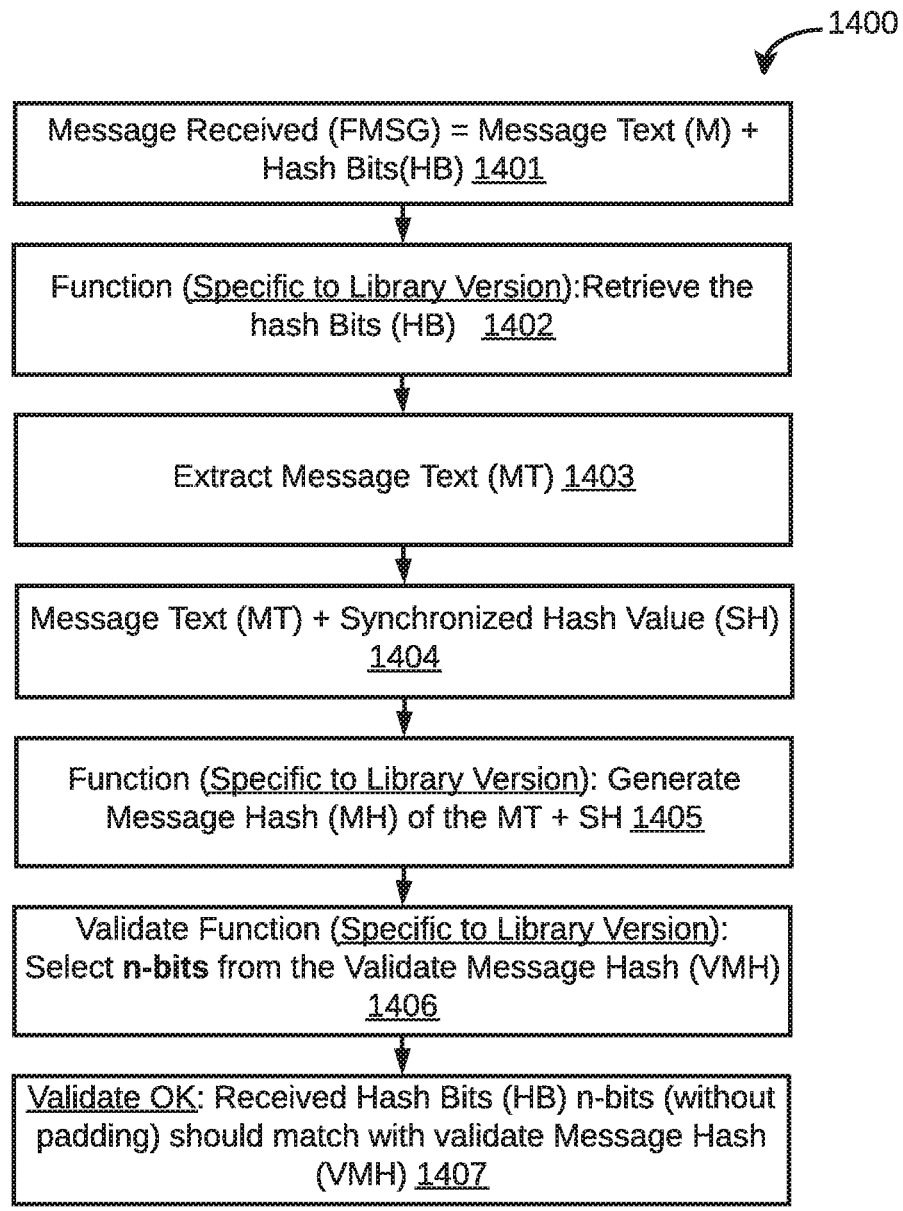
FIG. 14 is a flow diagram for validating message by a message validation block, in accordance with some embodiments of the present disclosure.

Referring now to FIG. 14, an exemplary process 1400 for validating message by a message validation block (MVLD) is depicted via a flow diagram, in accordance with some embodiments of the present disclosure. In some embodiments the message validation block may be used, to maintain a sequence integrity and to instantly identify the tampering effort to the first computing device. At step 1401, the message validating block may receive, from the message decryption block, a resultant of the addition of the message and the message hash. Further, at step 1402, the message validation block may extract the message hash based on a pre-installed library. Moreover, at step 1403, the message validation block may extract the message based on the pre-installed library.

Further, at step 1404, the message validation block may perform addition of the message and the message hash to create a validation message hash (VMH). Further, at step 1405, the message validation block may select n-bits of the VMH based on the specific library function. Moreover, the message validation block may validate the resultant of the addition of the message text the message hash when the message hash received by the message decryption block match with the n-bits of the VMH.

Figure 15:
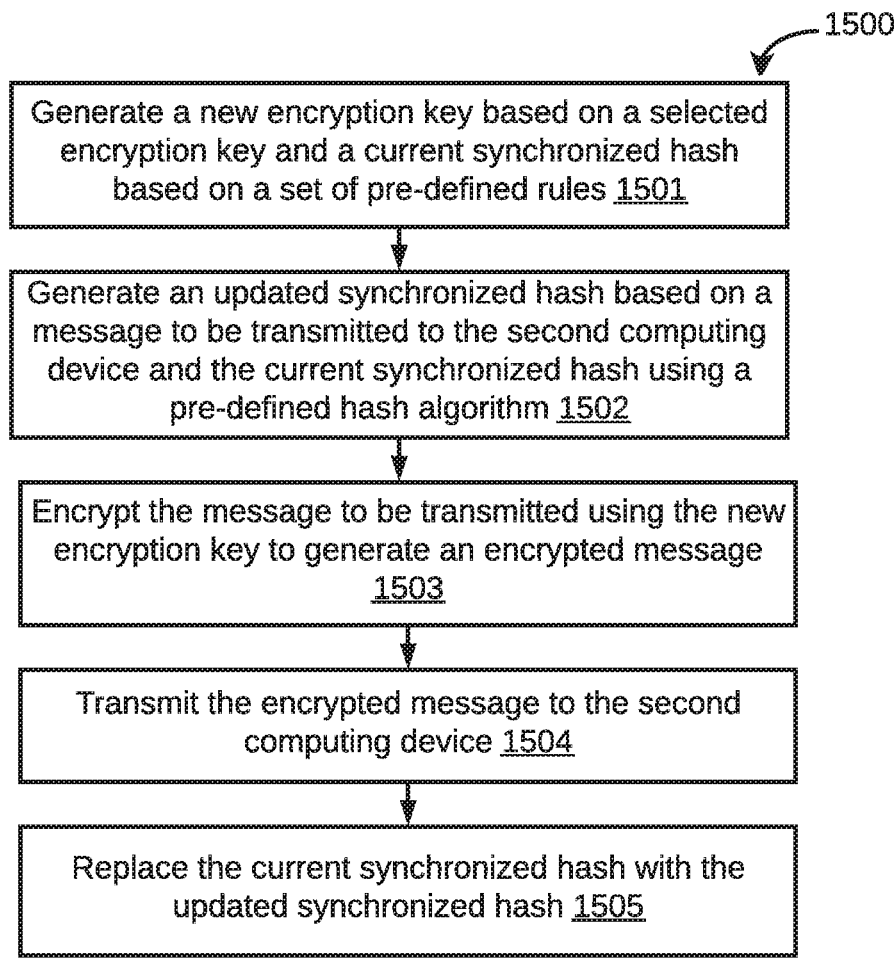
FIG. 15 is a flow diagram of an exemplary process for providing a secure communication between the first computing device and the second computing device, in accordance with some embodiments of the present disclosure.

Referring now to FIG. 15, an exemplary process 1500 for providing secure communication between the first computing device 101 and the second computing device 102 (or the application severe 103) is depicted via a flow diagram, in accordance with some embodiments of the present disclosure. It should be noted that the communication process is same for each of two devices involved in the secure communication (i.e., first computing device 101 and the second computing device 102, or the first computing device 101 and the application server 103). Thus, each of the steps recited below that is performed by the first secure communication framework implemented in the first computing device 101, may be similarly performed by the second communication framework implemented in the second computing device 102 or the application severe 103. Further, for the sake of brevity, the application server and the second computing device may be combinedly referred to as the second computing device in the below description and the claims.

As illustrated in the flowchart, the exemplary process 1500 may include the step of generating, by a first secure communication framework implemented in the first computing device or a second communication framework implemented in the second computing device, a new encryption key based on a selected encryption key and a current synchronized hash based on a set of pre-defined rules at step 1501. It may be noted that the selected encryption key may be selected from a plurality of encryption keys based on the set of pre-defined rules. Additionally, it may be noted that the set of pre-defined rules are retrieved from a pre-installed library of the first secure communication framework or the second communication framework respectively. Further, it may be noted that the current synchronized hash, the plurality of encryption keys, and the pre-installed library may be synchronized between the first computing device and the second computing device.

The exemplary process 1500 may further include the step of generating, by the first secure communication framework or the second communication framework, an updated synchronized hash based on a message to be transmitted and the current synchronized hash using a pre-defined hash algorithm at step 1502. It may be noted that the pre-defined hash algorithm may be retrieved from the pre-installed library of the first secure communication framework or the second secure communication framework respectively. The exemplary process 1500 may further include the steps of encrypting, by the first secure communication framework or the second communication framework, the message to be transmitted using the new encryption key to generate an encrypted message at step 1503, transmitting, by the first secure communication framework or the second communication framework, the encrypted message to the second computing device 102 or the first computing device 101 respectively at step 1504, and replacing, by the first secure communication framework or the second communication framework, the current synchronized hash with the updated synchronized hash at step 1505.

In some embodiments, the exemplary process 1500 may further include the step of generating an initial synchronized hash and the plurality of encryption keys while communicatively pairing the first computing device 101 and the second computing device 102. In some embodiments, communicatively pairing the first computing device 101 and the second computing device 102 may include the steps of transmitting, by the first secure communication framework, a device identification and a unique initialization key to the second computing device 102; and receiving, by the first secure communication framework, an encrypted catchphrase from the second computing device 102 upon validation of the device identification and the unique initialization key by the second computing device. It may be noted that the encrypted catchphrase may be generated by the second computing device 102 by encrypting a catchphrase using the unique initialization key. Further, in such embodiments, communicatively pairing the first computing device 101 and the second computing device 102 may include the steps of decrypting, by the first secure communication framework, the encrypted catchphrase using the unique initialization key to determine the catchphrase; transmitting, by the first secure communication framework, a response to the catchphrase and a request for the plurality of encryption keys to the second computing device 102; and receiving, by the first secure communication framework, an encrypted key-message from the second computing device 102. It may be noted that the encrypted key-message may be generated by the second computing device 102 by encrypting a key-message using the unique initialization key. Further, it may be noted that the key-message may include the plurality of encryption keys. Further, in such embodiments, communicatively pairing the first computing device 101 and the second computing device 102 may include the steps of decrypting, by the first secure communication framework, the encrypted key-message using the unique initialization key to determine the plurality of encryption keys; and generating, by the first secure communication framework, the initial synchronized hash based on the catchphrase and the response using the pre-defined hash algorithm retrieved from the pre-installed library of the first secure communication framework. Moreover, in such embodiments, communicatively pairing the first computing device 101 and the second computing device 102 may include the step of separately generating, by the second secure communication framework, the initial synchronized hash based on the catchphrase and the response using the pre-defined hash algorithm retrieved from the pre-installed library of the second secure communication framework.

Further, in some embodiments, the exemplary process 1500 may further include the steps of receiving, by the second secure communication framework or the first secure communication framework, the encrypted message transmitted from the first computing device or the second computing device respectively; separately generating, by the second secure communication framework or the first secure communication framework, the new encryption key based on the selected encryption key and the current synchronized hash based on the set of pre-defined rules. It may be noted that the selected encryption key may be separately selected from the plurality of encryption keys based on the set of pre-defined rules. In such embodiments, the exemplary process 1500 may further include the step of decrypting, by the second secure communication framework or the first secure communication framework, the encrypted message using the new encryption key to determine the message. Moreover, in such embodiments, the exemplary process 1500 may further include the steps of separately generating, by the second secure communication framework or the first secure communication framework, the updated synchronized hash based on the message and the current synchronized hash; and replacing, by the second secure communication framework or the first secure communication framework, the current synchronized hash with the updated synchronized hash.

Further, in some embodiments, the exemplary process 1500 may further include the steps of generating, by the first secure communication framework or the second communication framework, an updated message based on the message to be transmitted and the updated synchronized hash as per the set of pre-defined rules. It may be noted that, in such embodiments, encrypting the message may include encrypting the updated message using the new encryption key to generate an updated encrypted message. Further, it may be noted that, in such embodiments, transmitting the message may include transmitting the updated encrypted message. In such embodiments, the exemplary process 1500 may further include the steps of receiving, by the second secure communication framework or the first secure communication framework, the updated encrypted message transmitted from the first computing device 101 or the second computing device 102 respectively; decrypting, by the second secure communication framework or the first secure communication framework, the updated encrypted message using the new encryption key to determine the updated message. It may be noted that the new encryption key may be separately generated by the second secure communication framework or the first secure communication framework respectively. In such embodiments, the exemplary process 1500 may further include the step of extracting, by the second secure communication framework or the first secure communication framework, the message from the updated message based on the set of pre-defined rules and the updated synchronized hash. It may be noted that, in such embodiments, the updated synchronized hash may be separately generated by the second secure communication framework or the first secure communication framework respectively. In such embodiments, the exemplary process 1500 may further include the step of validating, by the second secure communication framework or the first secure communication framework, the message based on the updated message and the updated synchronized hash based on the set of pre-defined rules.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing this technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the technology. When implemented on a general-purpose microprocessor, the computer program code segments configure the microprocessor to create specific logic circuits.

Figure 16:
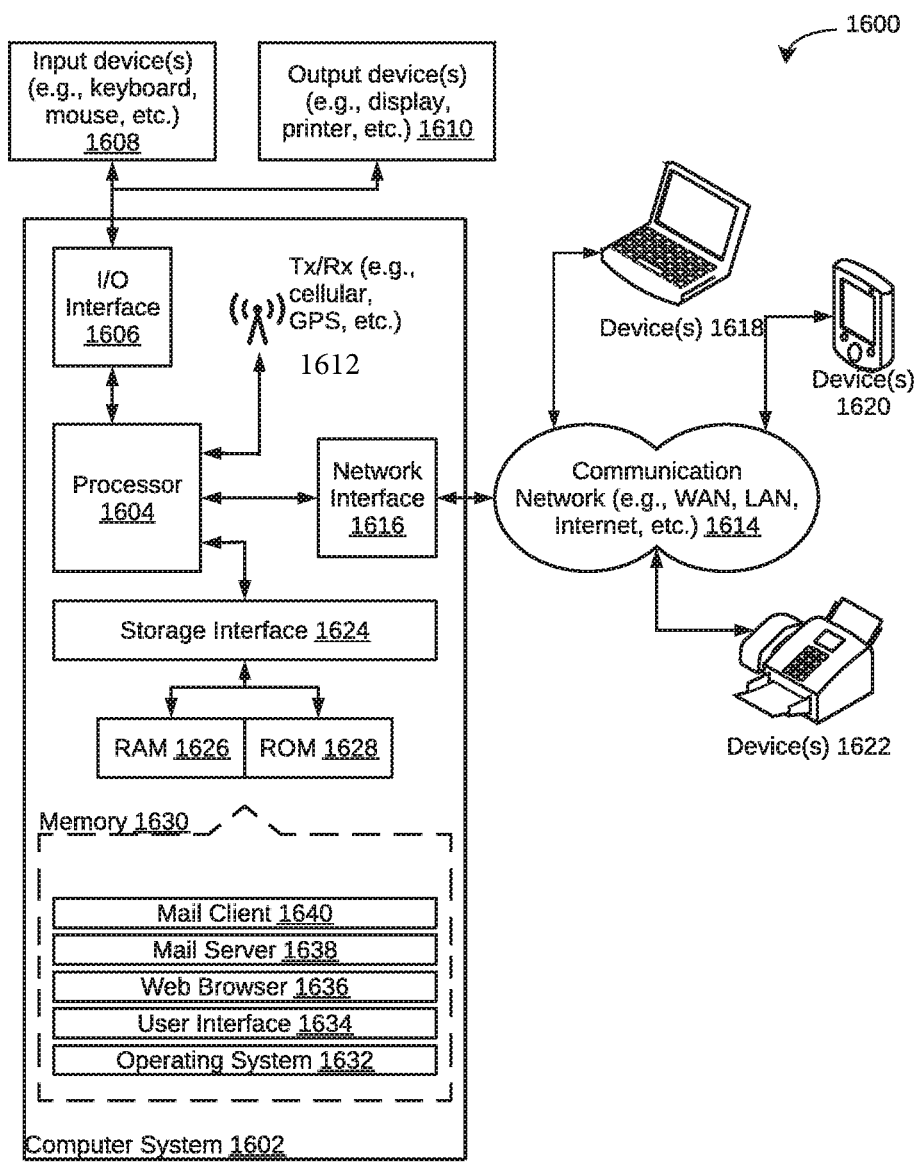
FIG. 16 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 16, a block diagram of an exemplary computer system 1601 for implementing embodiments consistent with the present disclosure is illustrated. Variations of computer system 1601 may be used for implementing the secure communication system 100 for providing a secure communication. Computer system 1601 may include a central processing unit ("CPU" or "processor") 1602. Processor 1602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1602 may be disposed in communication with one or more input/output (I/O) devices via I/O interface 1603. The I/O interface 1603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1603, the computer system 1601 may communicate with one or more I/O devices. For example, the input device 1604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1605 may be a printer, fax machine, video display (e.g., cathode ray tube (CRT), liquid crystal display (LCD), light-emitting diode (LED), plasma, or the like), audio speaker, etc. In some embodiments, a transceiver 1606 may be disposed in connection with the processor 1602. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1602 may be disposed in communication with a communication network 1608 via a network interface 1607. The network interface 1607 may communicate with the communication network 1608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1608 may include, without limitation, a direct interconnection, local area network (LAN), wide area network (WAN), wireless network (e.g., using Wireless Application Protocol), the Internet, etc. Using the network interface 1607 and the communication network 1608, the computer system 1601 may communicate with devices 1609, 1610, and 1611. These devices may include, without limitation, personal computer (s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1601 may itself embody one or more of these devices.

In some embodiments, the processor 1602 may be disposed in communication with one or more memory devices (e.g., RAM 1613, ROM 1614, etc.) via a storage interface 1612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1616, user interface application 1617, web browser 1618, mail server 1619, mail client 1620, user/application data 1621 (e.g., any data variables or data records discussed in this disclosure), etc. The operating system 1616 may facilitate resource management and operation of the computer system 1601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface application 1617 may facilitate display, execution, interaction, manipulation, or operation of program components through textual or graphical facilities. For example, user interfaces may provide computer interaction interface elements on a display system operatively connected to the computer system 1601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1601 may implement a web browser 1618 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1601 may implement a mail server 1619 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1601 may implement a mail client 1620 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 1601 may store user/application data 1621, such as the data, variables, records, etc. (e.g., a new encryption key, a selected encryption key, a current synchronized hash, a plurality of encryption keys, an updated synchronized hash, a pre-installed library, an initial synchronized hash, a device identification, a unique initialization key and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

The specification has described method and system for providing a light weight secure communication for computing device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing a secure communication between devices, the method comprising:
generating, by a first computing device, an initial synchronized hash and a plurality of encryption keys while communicatively pairing the first computing device and a second computing device, wherein generating the initial synchronized hash comprises:
transmitting, by the first computing device, a device identification and a unique initialization key to the second computing device;

receiving, by the first computing device, an encrypted catchphrase from the second computing device upon validation of the device identification and the unique initialization key, wherein the encrypted catchphrase is generated by encrypting a catchphrase using the unique initialization key;

decrypting, by the first computing device, the encrypted catchphrase using the unique initialization key to determine the catchphrase; and transmitting, by the first computing device, a response to the catchphrase and a request for the plurality of encryption keys to the second computing device;

generating, by the first computing device, a new encryption key based on a selected encryption key and a current synchronized hash based on a set of pre-defined rules, wherein the selected encryption key is selected from the plurality of encryption keys based on the set of pre-defined rules, the set of pre-defined rules are retrieved from a pre-installed library, and the current synchronized hash, the plurality of encryption keys, and the pre-installed library are synchronized between the first computing device and a second computing device;

generating, by the first computing device, an updated synchronized hash based on a message to be transmitted and the current synchronized hash using a pre-defined hash algorithm, wherein the pre-defined hash algorithm is retrieved from the pre-installed library;

encrypting, by the first computing device, the message to be transmitted using the new encryption key to generate an encrypted message;

transmitting, by the first computing device, the encrypted message to the second computing device; and replacing, by the first computing device, the current synchronized hash with the updated synchronized hash.

2. The method of claim 1, further comprising:

receiving, by the first computing device, an encrypted key-message from the second computing device, wherein the encrypted key-message is generated by encrypting a key-message using the unique initialization key and the key-message comprises the plurality of encryption keys;

decrypting, by the first computing device, the encrypted key-message using the unique initialization key to determine the plurality of encryption keys; and generating, by the first computing device, the initial synchronized hash based on the catchphrase and the response using the pre-defined hash algorithm retrieved from the pre-installed library.

3. The method of claim 1, further comprising:

receiving, by the first computing device, the encrypted message transmitted from the first computing device or the second computing device respectively;

separately generating, by the first computing device, the new encryption key based on the selected encryption key and the current synchronized hash based on the set of pre-defined rules, wherein the selected encryption key is separately selected from the plurality of encryption keys based on the set of pre-defined rules; and decrypting, by the first computing device, the encrypted message using the new encryption key to determine the message.

4. The method of claim 3, further comprising:

separately generating, by the first computing device, the updated synchronized hash based on the message and the current synchronized hash; and replacing, by the first computing device, the current synchronized hash with the updated synchronized hash.

5. The method of claim 1, further comprising:

generating, by the first computing device, an updated message based on the message to be transmitted and the updated synchronized hash as per the set of pre-defined rules;

encrypting, by the first computing device, the updated message using the new encryption key to generate an updated encrypted message; and transmitting, by the first computing device, the updated encrypted message.

6. A first computing device, comprising:

a processor; and a memory communicatively coupled to the processor and storing instructions that, when executed by the processor, cause the processor to:

generate an initial synchronized hash and the plurality of encryption keys while communicatively pairing the first computing device and the second computing device, wherein generating the initial synchronized hash comprises:

transmitting a device identification and a unique initialization key to the second computing device;

receiving an encrypted catchphrase from the second computing device upon validation of the device identification and the unique initialization key, wherein the encrypted catchphrase is generated by encrypting a catchphrase using the unique initialization key;

decrypting the encrypted catchphrase using the unique initialization key to determine the catchphrase; and transmitting a response to the catchphrase and a request for the plurality of encryption keys to the second computing device;

generate a new encryption key based on a selected encryption key and a current synchronized hash based on a set of pre-defined rules, wherein the selected encryption key is selected from a plurality of encryption keys based on the set of pre-defined rules, the set of pre-defined rules are retrieved from a pre-installed library, and the current synchronized hash, the plurality of encryption keys, and the pre-installed library are synchronized between the first computing device and a second computing device;

generate an updated synchronized hash based on a message to be transmitted and the current synchronized hash using a pre-defined hash algorithm, wherein the pre-defined hash algorithm is retrieved from the pre-installed library;

encrypt the message to be transmitted using the new encryption key to generate an encrypted message;

transmit the encrypted message to the second computing device; and replace current synchronized hash with the updated synchronized hash.

7. The first computing device of claim 6, wherein the instructions, when executed by the processor, further cause the processor to:

receive an encrypted key-message from the second computing device, wherein the encrypted key-message is generated by encrypting a key-message using the unique initialization key and the key-message comprises the plurality of encryption keys;

decrypt the encrypted key-message using the unique initialization key to determine the plurality of encryption keys; and generate the initial synchronized hash based on the catchphrase and the response using the pre-defined hash algorithm retrieved from the pre-installed library.

8. The first computing device of claim 6, wherein the instructions, when executed by the processor, further cause the processor to:
receive the encrypted message transmitted from the first computing device or the second computing device respectively;
separately generate the new encryption key based on the selected encryption key and the current synchronized hash based on the set of pre-defined rules, wherein the selected encryption key is separately selected from the plurality of encryption keys based on the set of pre-defined rules; and
decrypt the encrypted message using the new encryption key to determine the message.

9. The first computing device of claim 8, wherein the instructions, when executed by the processor, further cause the processor to:
separately generate the updated synchronized hash based on the message and the current synchronized hash; and
replace the current synchronized hash with the updated synchronized hash.

10. The first computing device of claim 6, wherein the instructions, when executed by the processor, further cause the processor to:
generate an updated message based on the message to be transmitted and the updated synchronized hash as per the set of pre-defined rules;
encrypt the updated message using the new encryption key to generate an updated encrypted message; and
transmit the updated encrypted message.

11. A non-transitory computer readable medium having stored thereon instructions for providing a secure communication between devices comprising an executable code which when executed by one or more processors, causes the one or more processors to:
generate an initial synchronized hash and the plurality of encryption keys while communicatively pairing the first computing device and the second computing device, wherein generating the initial synchronized hash further comprises,
transmitting a device identification and a unique initialization key to the second computing device;
receiving an encrypted catchphrase from the second computing device upon validation of the device identification and the unique initialization key, wherein the encrypted catchphrase is generated by encrypting a catchphrase using the unique initialization key;
decrypting the encrypted catchphrase using the unique initialization key to determine the catchphrase; and
transmitting a response to the catchphrase and a request for the plurality of encryption keys to the second computing device;
generate a new encryption key based on a selected encryption key and a current synchronized hash based on a set of pre-defined rules, wherein the selected encryption key is selected from a plurality of encryption keys based on the set of pre-defined rules, the set of pre-defined rules are retrieved from a pre-installed library, and the current synchronized hash, the plurality of encryption keys, and the pre-installed library are synchronized between a first computing device and a second computing device;
generate an updated synchronized hash based on a message to be transmitted and the current synchronized hash using a pre-defined hash algorithm, wherein the pre-defined hash algorithm is retrieved from the pre-installed library;
encrypt the message to be transmitted using the new encryption key to generate an encrypted message;
transmit the encrypted message to the second computing device; and
replace current synchronized hash with the updated synchronized hash.

12. The non-transitory computer-readable medium of claim 11, wherein the executable code, when executed by the one or more processors, further causes the one or more processors to:
receive an encrypted key-message from the second computing device, wherein the encrypted key-message is generated by encrypting a key-message using the unique initialization key and the key-message comprises the plurality of encryption keys;
decrypt the encrypted key-message using the unique initialization key to determine the plurality of encryption keys; and
generate the initial synchronized hash based on the catchphrase and the response using the pre-defined hash algorithm retrieved from the pre-installed library.

13. The non-transitory computer-readable medium of claim 11, wherein the executable code, when executed by the one or more processors, further causes the one or more processors to:
receive the encrypted message transmitted from the first computing device or the second computing device respectively;
separately generate the new encryption key based on the selected encryption key and the current synchronized hash based on the set of pre-defined rules, wherein the selected encryption key is separately selected from the plurality of encryption keys based on the set of pre-defined rules; and
decrypt the encrypted message using the new encryption key to determine the message.

14. The non-transitory computer-readable medium of claim 13, wherein the executable code, when executed by the one or more processors, further causes the one or more processors to:
separately generate the updated synchronized hash based on the message and the current synchronized hash; and
replace the current synchronized hash with the updated synchronized hash.

15. The non-transitory computer-readable medium of claim 11, wherein the executable code, when executed by the one or more processors, further causes the one or more processors to:
generate an updated message based on the message to be transmitted and the updated synchronized hash as per the set of pre-defined rules;
encrypt the updated message using the new encryption key to generate an updated encrypted message; and
transmit the updated encrypted message.

* * * * *